United States Patent
Joshi et al.

(10) Patent No.: US 10,230,705 B1
(45) Date of Patent: Mar. 12, 2019

(54) VERIFYING AUTHENTICITY OF MACHINE-READABLE IDENTIFIERS

(71) Applicant: Amazon Technologies, Inc., Seattle, WA (US)

(72) Inventors: Preyas Joshi, Kirkland, WA (US); Darren Ernest Canavor, Redmond, WA (US); Daniel Wade Hitchcock, Bothell, WA (US); Jesper Mikael Johansson, Redmond, WA (US); Jon Arron McClintock, Seattle, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 501 days.

(21) Appl. No.: 14/658,276

(22) Filed: Mar. 16, 2015

(51) Int. Cl.
*H04L 29/06* (2006.01)

(52) U.S. Cl.
CPC .................. *H04L 63/08* (2013.01)

(58) Field of Classification Search
None
See application file for complete search history.

(56) References Cited

U.S. PATENT DOCUMENTS

| | | | |
|---|---|---|---|
| 8,430,310 B1* | 4/2013 | Ho | G06F 21/35 235/382 |
| 9,038,887 B1* | 5/2015 | O'Hanlon | G06Q 20/02 235/375 |
| 9,225,519 B1* | 12/2015 | Fraccaroli | H04L 9/0838 |
| 9,256,881 B2* | 2/2016 | Engels | H04W 4/80 |
| 9,331,856 B1* | 5/2016 | Song | H04L 9/3247 |
| 2007/0083764 A1* | 4/2007 | Chiba | G06T 1/0028 713/176 |
| 2008/0011841 A1* | 1/2008 | Self | G06F 19/00 235/385 |
| 2011/0258443 A1* | 10/2011 | Barry | G06F 21/31 713/168 |
| 2012/0271712 A1* | 10/2012 | Katzin | G06Q 30/06 705/14.51 |
| 2012/0308003 A1* | 12/2012 | Mukherjee | G09C 5/00 380/243 |
| 2013/0110607 A1* | 5/2013 | Basmajian | G06Q 30/0234 705/14.26 |
| 2013/0229261 A1* | 9/2013 | Gates | G02B 27/017 340/10.1 |
| 2014/0040050 A1* | 2/2014 | Argue | G06Q 20/0453 705/16 |
| 2014/0143090 A1* | 5/2014 | Deyle | G06Q 10/0833 705/26.35 |

(Continued)

*Primary Examiner* — Farid Homayounmehr
*Assistant Examiner* — Olanrewaju J. Bucknor
(74) *Attorney, Agent, or Firm* — Thomas Horstemeyer, LLP

(57) ABSTRACT

Disclosed are various embodiments for verifying the authenticity of machine-readable identifiers, such as quick response (QR) codes or other identifiers. After data is received corresponding to a machine-readable identifier, environmental data may be acquired with respect to an environment of the machine-readable identifier. The authenticity of the machine-readable identifier may be verified based at least in part on the environmental data. In some embodiments, a verification request may be sent to a trusted authority.

23 Claims, 7 Drawing Sheets

(56) References Cited

U.S. PATENT DOCUMENTS

| | | | | |
|---|---|---|---|---|
| 2014/0151445 A1* | 6/2014 | Pawlik | ................... | G06K 5/00 |
| | | | | 235/375 |
| 2014/0151454 A1* | 6/2014 | Pawlik | ................... | G06K 7/10 |
| | | | | 235/462.41 |
| 2015/0302421 A1* | 10/2015 | Caton | ................. | G06Q 30/018 |
| | | | | 705/17 |
| 2015/0379321 A1* | 12/2015 | Soborski | ............ | G06Q 30/0185 |
| | | | | 235/375 |
| 2016/0019431 A1* | 1/2016 | Wang | ................. | G06K 9/2054 |
| | | | | 382/182 |

* cited by examiner

200

Scan Code to
Purchase

FIG. 4A

Scan Code to
Purchase

FIG. 4B

VERIFYING AUTHENTICITY OF MACHINE-READABLE IDENTIFIERS

BACKGROUND

With the proliferation of mobile computing devices, various forms of machine-readable identifiers have become popular. Quick response (QR) codes are one type of machine-readable identifier that has become widely used. Although barcodes have been commonplace since the 1970s, the amount of data that can be practically encoded in a barcode is relatively limited. Two-dimensional barcodes, such as QR codes, greatly increase the amount of data that may be encoded. For example, QR codes may encode a uniform resource identifier (URI) such as a uniform resource locator (URL).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A and 4B show two non-limiting examples of verifying identifiers according to various embodiments of the present disclosure.

DETAILED DESCRIPTION

The present disclosure relates to verifying the authenticity of machine-readable identifiers. Machine-readable identifiers, such as quick response (QR) codes, may be used to launch a uniform resource locator (URL), send a text message, load contact information, or perform other actions. Machine-readable identifiers may be included on display advertising on billboards, in subway stations, or even on menus in restaurants and other stores. Customers may scan a machine-readable identifier to place an order or to receive a discounted offer or other incentive.

Several security issues, however, may arise out of the use of machine-readable identifiers. For example, a malicious user may cover over a legitimate QR code on display advertising with a fraudulent QR code. The fraudulent QR code, when scanned, may lead the customer to a phishing web site that is designed to resemble what the customer would expect from the display advertising. The phishing web site may elicit personal information from the customer, e.g., credit card information.

In another scenario, a malicious user may replace the legitimate QR code with a QR code that leads the customer to the correct web site, but with an additional parameter in the URL that allows the malicious user to gain referral credit. In yet another scenario, a user may move a QR code that is considered authentic in one location to another location for which it is not considered authentic. For example, a retailer may provide a discounted offer via a QR code in one location, and a user may move the QR code to another location at which the retailer does not intend to provide the discounted offer.

Various embodiments of the present disclosure facilitate verification of the authenticity or legitimacy of machine-readable identifiers. In one embodiment, additional environmental data acquired from the location of the machine-readable identifier may be used for verification. Such environmental data may include visual cues surrounding the machine-readable identifier, ambient audio captured from the location, the determined location, and so on. In another embodiment, a verification request may be submitted to a trusted authority in order to verify a cryptographic signature and/or other internal characteristics of the machine-readable identifier. In the following discussion, a general description of the system and its components is provided, followed by a discussion of the operation of the same.

Figure 1:
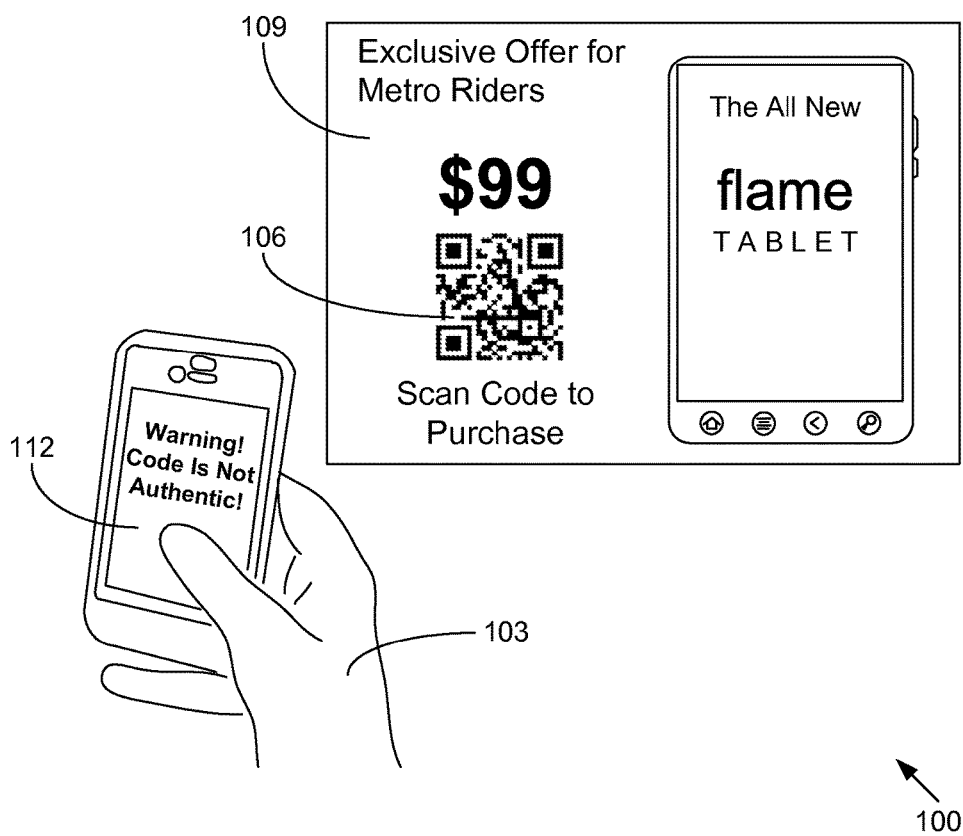
FIG. 1 shows is an example scenario according to various embodiments of the present disclosure.

Referring now to FIG. 1, shown is an example scenario 100 according to various embodiments of the present disclosure. A user 103 scans a QR code 106 present on a display advertisement 109 using a mobile device 112. The display advertisement 109 offers a discounted price for a tablet computer for targeted customers who are riding a transit system. The display advertisement 109 exhorts the user 103 to scan the QR code 106 in order to purchase the tablet computer at the discounted price. It would be expected that the QR code 106 encodes a special URL that when accessed would facilitate ordering of the tablet computer.

Suppose, however, that a malicious user has covered over the real QR code 106 on the display advertisement 109 with a fraudulent QR code. The fraudulent QR code may encode a URL for a web site that appears to facilitate ordering of the tablet computer but instead merely receives the customer's payment information for nefarious purposes. In some cases, the web site may contain malware and may attempt to exploit the mobile device 112. Nonetheless, when the user 103 scans the fraudulent QR code 106 with the mobile device 112, the scanning program executed via the mobile device 112 determines that the QR code is not authentic using one or more of the approaches that will be detailed herein. Further, the scanning program may prevent automatically launching the URL and may generate an alert. Here, the display of the mobile device 112 informs the user 103 that the code is not authentic. Accordingly, the user 103 then avoids accessing the fraudulent URL or providing private information.

Figure 2:
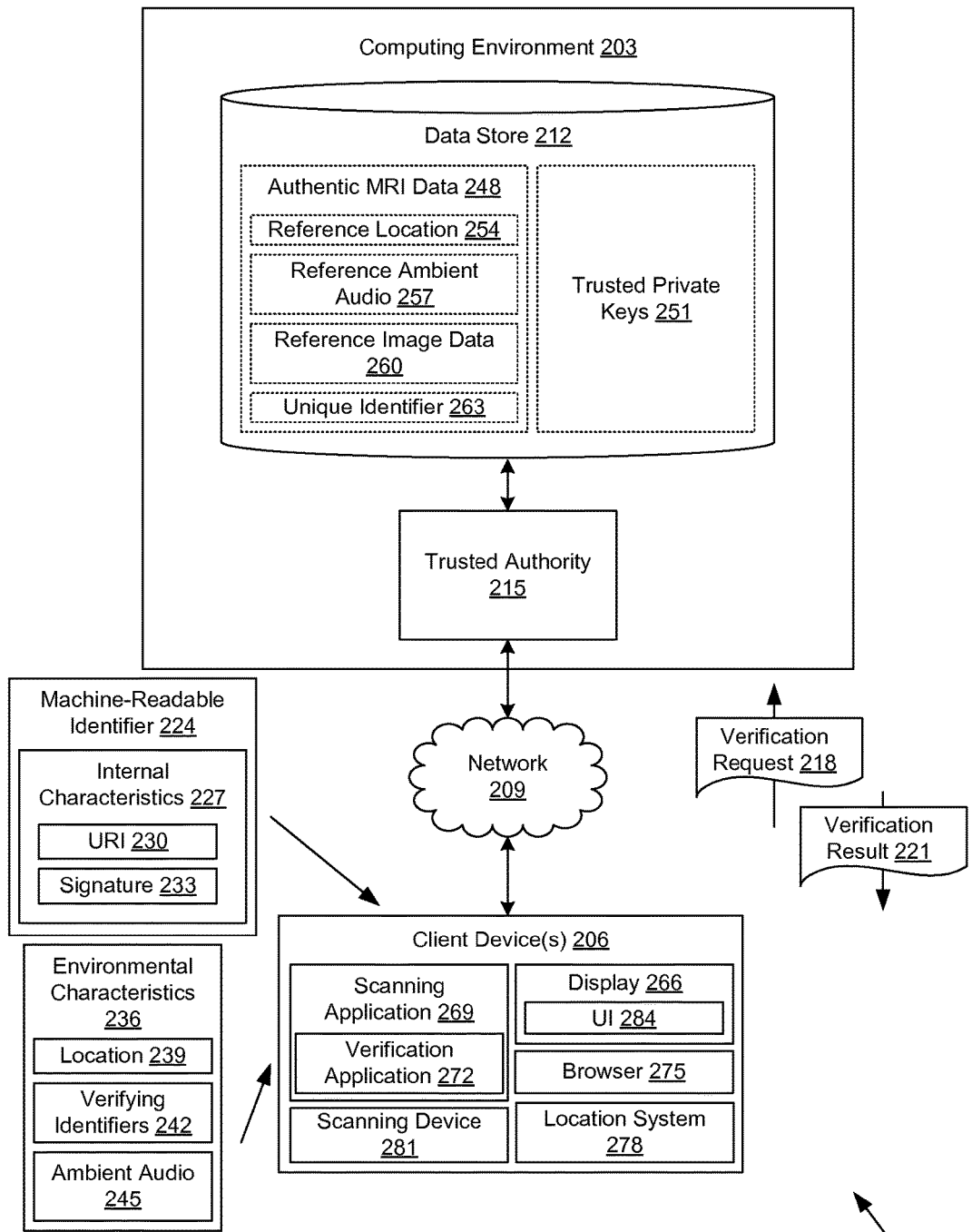
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a trusted authority 215 and other applications, services, processes, systems, engines, or functionality not discussed in detail herein. The trusted authority 215 is executed to receive verification requests 218 from client devices 206 and to return verification results 221 to the client devices 206 via the network 209. Specifically, the verification requests 218 pertain to machine-readable identifiers 224 scanned in by the client devices 206, and the verification results 221 indicate whether the machine-readable identifiers 224 are authentic. The determination of authenticity may be absolute (e.g., a machine-readable identifier 224 may be either authentic or not authentic) or may depend upon location (e.g., a machine-readable identifier 224 that is considered authentic at one location may be considered not authentic at another location).

A machine-readable identifier 224 may comprise any type of identifier that conveys data to a client device 206. According to one embodiment, the machine-readable identifier 224 comprises an optical code (e.g., a machine-readable representation of information in a visual format), such as a barcode, a two-dimensional barcode, a QR code, or other identifier that can be scanned or read using a light-based data transfer mechanism. According to other embodiments, the machine-readable identifier 224 comprises a radio signal-based identifier, such as a radio-frequency identifier (RFID) or a near-field communication (NFC) identifier, an acoustic-based identifier (e.g., sound wave embedded data), magnetic field-based identifier (e.g., a magnetic stripe of a payment instrument), or another type of identifier that may convey data to a client device 206. The machine-readable identifier 224 may include one or more internal characteristics 227. The internal characteristics 227 are encoded within the machine-readable identifier 224. For example, the internal characteristics 227 may include a uniform resource identifier (URI) 230 such as a uniform resource locator (URL), a cryptographic signature 233, a cryptographic certificate, a globally unique identifier, and/or other data. Based on the symbology being used (e.g., UPC, Code 39, Code 128, and PDF417), an optical code may comprise data characters (or codewords in the case of, e.g., PDF417) and/or overhead characters represented by a particular sequence of bars and spaces that may have varying widths.

A machine-readable identifier 224 may also be associated with one or more environmental characteristics 236. Environmental characteristics 236 are determined from an environment surrounding the machine-readable identifier 224. For example, various environmental characteristics 236 may include a location 239, verifying identifiers 242, ambient audio 245, and other characteristics. The location 239 may comprise a location (e.g., latitude/longitude coordinates) where the machine-readable identifier 224 is scanned. Verifying identifiers 242 may include other machine-readable identifiers that are present in the immediate environment of the machine-readable identifier 224 that may be used to confirm the authenticity of the machine-readable identifier 224. The ambient audio 245 may correspond to the sounds that are typically present at the location 239 of the machine-readable identifier 224.

The data stored in the data store 212 includes, for example, authentic machine-readable identifier data 248, trusted private keys 251, and potentially other data. The authentic machine-readable identifier data 248 may include various data associated with machine-readable identifiers 224 that are considered authentic. The authentic machine-readable identifier data 248 may include a reference location 254, reference ambient audio 257, reference image data 260, a unique identifier 263, and/or other data.

The reference location 254 may correspond to a particular location (e.g., latitude/longitude coordinates) where an authentic machine-readable identifier 224 has been deployed. The reference location 254 may correspond to a position and a threshold deviation (e.g., to account for scanning the machine-readable identifier 224 at various locations near the location of the machine-readable identifier 224) or to a set of permissible reference locations 254 or areas (e.g., to account for machine-readable identifiers 224 deployed on moving vehicles or that otherwise may move from time to time). In some embodiments, the reference location 254 may be crowdsourced by scanning the machine-readable identifier 224 via a plurality of users and a plurality of client devices 206 over time. In some cases, the reference locations 254 may be with respect to known WI-FI access points, cellular towers, and so on. In some embodiments, the reference location 254 may include a magnetic direction component. For example, a machine-readable identifier 224 may be mounted such that it points or faces a certain direction, e.g., south. The magnetic direction may be useful in detecting whether the machine-readable identifier 224 has been moved.

The reference ambient audio 257 may correspond to ambient sounds expected at the location of the machine-readable identifier 224 (perhaps with reference to a specific time, such as when a train passes by or a waterfall is turned on). The reference ambient audio 257 may be determined at or near the time of deployment of the machine-readable identifier 224. Alternatively, the reference ambient audio 257 may be crowdsourced via a plurality of client devices 206 over time. The reference ambient audio 257 may change in characteristics based upon the time of day, day of the week, season, special events, and/or other factors, and multiple versions of the reference ambient audio 257 may be stored to account for such changes. In some cases, characteristics of the reference ambient audio 257 may be stored in lieu of the actual audio. Such characteristics may include volume, frequencies, durations, and/or other characteristics that may be extracted from audio.

The reference image data 260 may include data characterizing the visual surroundings of the machine-readable identifier 224. For example, the machine-readable identifier 224 may be deployed within a display advertisement 109 (FIG. 1), and the reference image data 260 may include those portions of the display advertisement 109 other than the machine-readable identifier 224. In addition, the reference image data 260 may include visual surroundings (e.g., other artwork upon a wall on which the machine-readable identifier 224 is deployed) other than a display advertisement 109 or other predetermined surrounding. In some cases, text or other characteristics of the image may be stored in lieu of actual images. In one embodiment, the reference image data 260 may be crowdsourced via a plurality of users and a plurality of client devices 206 scanning the machine-readable identifier 224 where it has been deployed. Alternatively, the reference image data 260 may be preconfigured (e.g., a photo may be taken by an authorized user who installs a poster bearing the machine-readable identifier 224 upon a wall).

In some cases, the reference image data 260 may have images from multiple angles, e.g., toward the machine-readable identifier 224 and away from the machine-readable identifier 224. Such reference image data 260 may be used, for example, to verify images from a client device 206 having both front-facing and rear-facing cameras. In one embodiment, the reference image data 260 may record the signature of a strobe or other lighting pattern that is configured to be in place for the given machine-readable identifier 224.

The unique identifier 263 may uniquely identify a machine-readable identifier 224. For example, the machine-readable identifier 224 may encode the unique identifier 263 as an internal characteristic 227. In one embodiment, the trusted authority 215 may be configured to confirm the machine-readable identifier 224 as authentic merely because it includes the unique identifier 263.

The trusted private keys 251 may be used to generate digital signatures 233 within the machine-readable identifier 224. For example, the other content of the machine-readable identifier 224 may be submitted for a signature operation by the trusted authority 215. The resulting signature 233 may be included within the machine-readable identifier 224, which may later be used to verify that the machine-readable identifier 224 is authentic.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices. The client device 206 may include a display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a scanning application 269, a verification application 272, a browser 275, a location system 278, and/or other applications and systems. The scanning application 269 may be executed to use a scanning device 281 to scan a machine-readable identifier 224 and other environmental characteristics 236 from an environment of the client device 206. The scanning device 281 may comprise a camera, an infrared sensor, a near field communication (NFC) device, an RFID reader, and/or other devices. In some instances, a client device 206 may have multiple scanning devices 281, e.g., a front-facing camera and a back-facing camera. The scanning application 269 may be configured to decode the machine-readable identifier 224 and also extract the internal characteristics 227 from the machine-readable identifier 224. The scanning application 269 may launch a browser 275 to access a URI 230 within the machine-readable identifier 224.

The scanning application 269 may also invoke the verification application 272 to determine whether the machine-readable identifier 224 is authentic. The verification application 272 may be a component of the scanning application 269 or may be a separate application. The scanning application 269 may be configured to perform specified actions based on whether the machine-readable identifier 224 is determined to be authentic or unauthentic.

The verification application 272 may operate in an on-line mode or an off-line mode in various embodiments. For example, in an on-line mode, the verification application 272 may generate a verification request 218 and send the verification request 218 to the trusted authority 215 via the network 209. The verification application 272 may then receive a verification result 221 from the trusted authority 215 indicating whether the machine-readable identifier 224 is authentic. In an off-line mode, the client device 206 may include sufficient logic and data to perform a verification of authenticity without consulting a trusted authority 215. Alternatively, in an off-line mode, the verification application 272 may queue up the verification requests 218 until connectivity to the computing environment 203 is restored. In the interim, the verification application 272 may provide warnings, defer actions, or perform actions that can be reversed based on receiving a verification result 221 at a later time from the trusted authority 215.

The scanning application 269, the verification application 272, and/or the browser 275 may render various user interfaces 284 upon the display 266. The scanning application 269 may also provide information via a user interface 284 as to the source of the machine-readable identifier 224 and whether the machine-readable identifier 224 has a valid signature. The client device 206 may be configured to execute applications beyond the above stated applications such as, for example, email applications, social networking applications, word processors, spreadsheets, and/or other applications.

Next, a general description of the operation of the various components of the networked environment 200 is provided. To begin, a machine-readable identifier 224 is created by a merchant, a service provider, or another organization. The internal characteristics 227 may be encoded into the machine-readable identifier 224. In some embodiments, the contents of the machine-readable identifier 224 may be signed by a trusted authority 215 using a trusted private key 251, with the resulting signature 233 being incorporated in the machine-readable identifier 224. The machine-readable identifier 224 may include a unique identifier 263. The machine-readable identifier 224 may then be deployed at a location 239. Various environmental characteristics 236 may be recorded regarding the location 239, including the reference location 254, the reference ambient audio 257, the reference image data 260, and so on.

In one scenario, one or more environmental characteristics 236 may be embedded within the machine-readable identifier 224. For example, when the machine-readable identifier 224 is being deployed, an agent may record one or more environmental characteristics 236 using a client device 206. The client device 206 may generate the machine-readable identifier 224 via an attached label printer, and the agent may affix the machine-readable identifier 224 to a display advertisement. The generated machine-readable identifier 224 may encode characteristics such as location 239, verifying identifiers 242, magnetic direction, and so on, so that an internal verification procedure may be performed by client devices 206 at a later time.

A user of a client device 206 may then scan the machine-readable identifier 224 using the scanning application 269. For example, the user may cause an image to be captured that includes the machine-readable identifier 224. The verification application 272 may then perform a verification of the authenticity of the machine-readable identifier 224. This may be an off-line verification purely performed by the verification application 272. Alternatively, this may be an on-line verification where a verification request 218 is generated and sent to the trusted authority 215 and a verification result 221 is received from the trusted authority 215.

If the machine-readable identifier 224 is determined to be authentic, the URI 230 encoded therein may be launched via the browser 275, or another action may be performed with respect to the machine-readable identifier 224. However, if the machine-readable identifier 224 is not authentic, the URI 230 may not be launched, and the verification application 272 may generate an alert. Several different approaches to determining authenticity of machine-readable identifiers 224 will next be described. It is understood that one or more of these approaches, individually or in combination, may be used in various embodiments.

Figure 3:
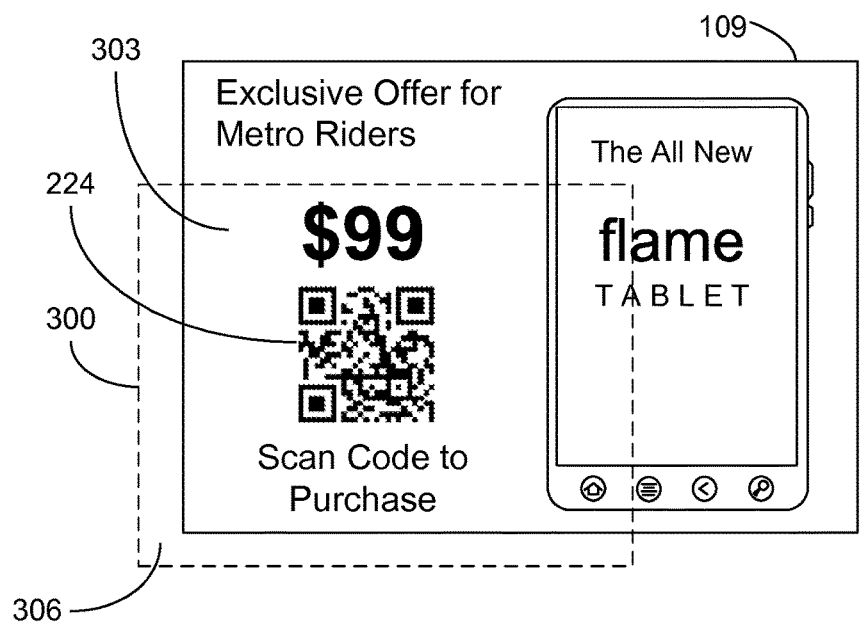
FIG. 3 illustrates an example image capture region with respect to a display advertisement of FIG. 1 according to various embodiments of the present disclosure.

Referring to FIG. 3, illustrated is an example image capture region 300 with respect to the display advertisement 109 of FIG. 1 according to various embodiments. Not only does the image capture region 300 include the machine-readable identifier 224, the image capture region 300 may also include another portion 303 of the display advertisement 109 and an area 306 outside of the display advertisement 109. This other portion 303 and/or area 306 may include verifying identifiers 242 (FIG. 2) that may be used to verify the authenticity of the machine-readable identifier 224. In one embodiment, the verification application 272 (FIG. 2) may direct the user to capture the other portion 303 and/or area 306 in order to perform the authenticity verification.

Steganographic techniques may be used to "watermark" the other portion 303 and/or area 306 with hidden verification data. Variations in color, luminosity, shape, textual content, etc., may identify whether the machine-readable identifier 224 is to be considered authentic. This may be referred to as a verifying identifier 242. Alternatively, the verifying identifier 242 may be a non-hidden identifier, such as a QR code. The verifying identifier 242 may encode, for example, a checksum or other computed derivative value for data encoded in the machine-readable identifier 224. Thus, if the machine-readable identifier 224 is replaced with a fraudulent identifier, the verifying identifier 242 would not match the fraudulent identifier, which may then be identified as not authentic.

It is noted that the size of the area 306 may be variable, and the area 306 may correspond to any geometric shape. In fact, the size and shape of the area 306 may change with each scan or in response to certain events (e.g., a signal indicating suspected fraud occurring at the given location). Accordingly, an attacker cannot learn what part of the area surrounding the machine-readable identifier 224 will be used for authentication.

FIGS. 4A and 4B show two non-limiting examples of verifying identifiers 242 (FIG. 2) according to various embodiments. In each, the verifying identifier 242 is embedded within the text "Scan Code to Purchase," which is in the other portion 303 (FIG. 3) of the display advertisement 109 (FIG. 3). In FIG. 4A, various characters of the text are in bold while others are not. This may encode a verification pattern dependent on content of the machine-readable identifier 224 (FIG. 3). In FIG. 4B, various characters of the text have been augmented with black blocks, which may also encode a verification pattern. In other examples, the text itself may be selected to comprise a verifying identifier 242 and optical character recognition (OCR) and/or other operations may be performed to extract the text from an image.

Referring back to FIG. 2, ambient audio 245 may be used to verify the authenticity of a machine-readable identifier 224. Specifically, ambient audio 245 may be used to determine whether a machine-readable identifier 224 is located at a designated location. For example, train stations, shopping malls, airports, libraries, etc., may be associated with particular patterns of ambient audio 245. Such patterns may be recorded as reference ambient audio 257. When a user is ready to scan and verify a machine-readable identifier 224, the verification application 272 may sample the ambient audio 245 in the surrounding environment and then submit the ambient audio 245 and/or characteristics thereof to the trusted authority 215 for verification. The trusted authority 215 and/or the verification application 272 may compare the ambient audio 245 with the reference ambient audio 257 to perform the verification. In one embodiment, a verifying identifier 242 may correspond to high frequency audio intentionally emitted in the area of the machine-readable identifier 224, and the machine-readable identifier 224 may be verified based at least in part on the presence of this high frequency audio signal.

Similarly, ambient light may be used to verify a machine-readable identifier 224. A strobe having a certain pattern may be deployed in conjunction with a machine-readable identifier 224. The scanning application 269 may sample the ambient light to determine whether the strobe is present. The presence of a strobe or a certain type of light may be considered an environmental characteristic 236 that may be used for verification of the machine-readable identifier 224.

Locations 239 may be used to verify the authenticity of a machine-readable identifier 224. A reference location 254 may be recorded when the machine-readable identifier 224 is deployed. When a user is ready to scan and verify a machine-readable identifier 224, the verification application 272 may determine the current location of the client device 206 from the location system 278. For example, the location system 278 may determine a location 239 by global positioning system (GPS), known WI-FI access points, cellular tower triangulation, network address geolocation, and/or other approaches.

The location 239 may then be compared with the reference location 254 to determine whether the machine-readable identifier 224 is in the expected reference location 254. This can determine whether a machine-readable identifier 224 has been moved. In some embodiments, a tolerance threshold may be selected based upon an expected distance between the client device 206 and the machine-readable identifier 224 (e.g., a user may stand ten feet away from the machine-readable identifier 224 when scanning it), errors in the location system 278, and/or other factors.

The verification application 272 may perform verification using internal characteristics 227 of the machine-readable identifier 224. For example, the verification application 272 may confirm that the signature 233 corresponds to the content of the machine-readable identifier 224 and that the signature 233 was indeed generated by the trusted authority 215 using a trusted private key 251.

Crowdsourcing techniques may be employed for verifying machine-readable identifiers 224. For example, environmental characteristics 236 (e.g., locations 239, verifying identifiers 242, ambient audio 245, images, time of verification request 218, etc.) may be recorded by the trusted authority 215 as a plurality of users with a plurality of client devices 206 submit verification requests 218. As a profile builds for a machine-readable identifier 224 or location 239, a change in the machine-readable identifier 224 or its location 239 may indicate tampering by a malicious user. Various thresholds may be built into verification in order to exclude outlying reported data.

In using the crowdsourcing techniques, an organization may determine whether a given machine-readable identifier 224 has been updated according to a schedule. For instance, an advertising company may be contracted to replace display advertising including a machine-readable identifier 224 at a certain time or at a certain interval. The crowdsourced data may indicate whether the machine-readable identifier 224 has indeed changed. This allows the organization to assess the performance of the advertising company.

Verifications may also be used to monetize the presentation of machine-readable identifiers 224. The trusted authority 215 may be configured to record the number of scans of a given machine-readable identifier 224. The cost for displaying a machine-readable identifier 224 may depend at least in part on the number of scans, which provides a visibility metric for the accompanying advertising.

Also, verification may be determined based at least in part on whether users report that the machine-readable identifier 224 is not authentic (e.g., a user manually determines that the machine-readable identifier 224 leads to a phishing web site and reports this). If users complete a purchase or otherwise confirm that the machine-readable identifier 224 is legitimate, the verification may also leverage this confirmation. For example, if a threshold number of users complete a purchase via the machine-readable identifier 224, the trusted authority 215 may consider the machine-readable identifier 224 to be authentic.

In one embodiment, off-line verification by the verification application 272 may be enabled via later on-line verification using the trusted authority 215. While in an off-line mode, the verification application 272 may ensure that an action taken with respect to the machine-readable identifier 224 does not have adverse consequences when the machine-readable identifier 224 cannot be verified. For example, an item at the URI 230 may be added to a wishlist or virtual shopping cart rather than actually purchased when the verification application 272 is in an off-line mode.

In some embodiments, the client device 206 may correspond to a vehicle. For example, a vehicle may be outfitted with one or more scanning devices 281 such as cameras. The vehicle may then be equipped to automatically scan for machine-readable identifiers 224 as it is being driven with minimal to no user interaction. Thus, a QR code displayed on a billboard may be scanned automatically by the vehicle. The machine-readable identifiers 224 captured by the vehicle may then be communicated to a client device 206 in the vehicle (such as a smartphone, etc.) via BLUETOOTH or another communication protocol for later review by a user.

A determination of authenticity, either by the verification application 272 or by the trusted authority 215 may employ one or more confidence levels compared to one or more thresholds for authenticity or inauthenticity. Various factors may go into calculating a confidence score as to whether the machine-readable identifier 224 is authentic or an inverse confidence score as to whether the machine-readable identifier 224 is not authentic. Additional factors that may be employed in a determination of authenticity may include fraud history and other risk factors.

Some factors may be assigned a greater weight than others. As a non-limiting example, a location 239 may weighted to be a greater component in determining the confidence score as compared with ambient audio 245. Also, the authenticity or inauthenticity thresholds may be adjustable.

A given factor may produce a result of lesser confidence due to lesser quality input data. For example, the ambient audio 245 may be of a relatively low quality. Accordingly, a measure of authenticity that uses low-quality ambient audio 245 may be weighted to be relatively less of a factor to the confidence score. Similarly, an image including verifying identifiers 242 may be blurry, a location 239 may be less precise due to poor satellite reception by the location system 278, and so on.

In some scenarios, a user may be prompted to provide additional data in order for the authenticity determination to proceed. For example, if a captured image is blurry, the user may be prompted to retake a picture with the client device 206. If a determination using ambient audio 245 is inconclusive, the user may be prompted to capture additional ambient audio 245 via the client device 206.

It is noted that embodiments of the present disclosure may be used in a variety of contexts. Non-limiting examples of appropriate contexts include commerce (e.g., shopping in the physical world, electronic commerce, or a combination thereof), payments, to identify a class of objects (e.g., merchandise) or unique items (e.g., patents), use on a display of a portable electronic device, such as a mobile telephone, personal digital assistant, tablet computer, laptop computer, or other device having an electronic display (e.g., a customer, such as a shopper, airline passenger, or person attending a sporting event or theater event, may cause an optical code to be displayed on their portable electronic device so that an employee (e.g., merchant-employee) can read the optical code via an optical code reader to allow the customer to redeem a coupon or to verify that the customer has purchased a ticket for the event).

In one scenario, a machine-readable identifier 224 may be used bi-directionally to establish trust between two transacting parties. For example, suppose that a customer walks into a physical store and scans a machine-readable identifier 224 on one or more products in the store, thereby adding the products to a virtual shopping cart. Upon completion, the customer pays for the virtual shopping cart with an online payment account using a mobile device. Once payment is confirmed, the service may return a signed machine-readable identifier 224 confirming that the customer has paid for all of the products. The customer may then head out of the store to a checkout employee. The checkout employee scans the signed machine-readable identifier 224 to confirm that the products were purchased. Once confirmed, the employee allows the customer to walk out with the products being paid for.

This mechanism can also be employed to perform peer-to-peer payments between multiple parties. For example, suppose that a payee generates a first secure machine-readable identifier 224 to request $20. A payer then scans the first secure machine-readable identifier 224 through a payment application. The payment application authenticates that the payer's account has $20 and then generates a second secure machine-readable identifier 224. The payee may then scan the second secure machine-readable identifier 224 using a payment application to complete the transaction. The authenticity of the machine-readable identifiers 224 in these scenarios may be verified according to the techniques described herein.

Figure 5A:
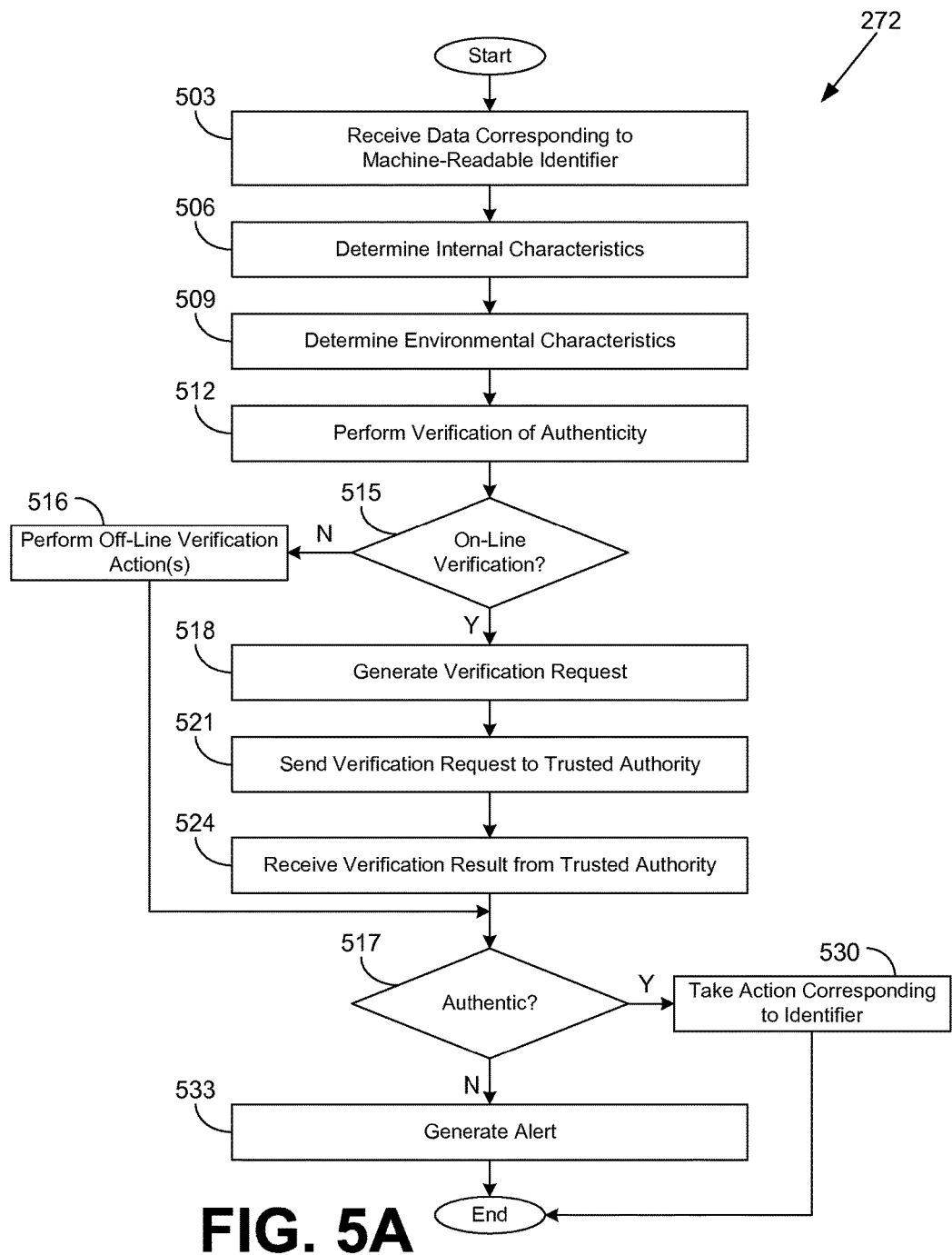
FIG. 5A is a flowchart illustrating one example of functionality implemented as portions of a verification application executed in a client device in the networked environment of FIG. 2 according to various embodiments of the present disclosure.

Referring next to FIG. 5A, shown is a flowchart that provides one example of the operation of a portion of the verification application 272 according to various embodiments. It is understood that the flowchart of FIG. 5A provides merely an example of the many different types of functional arrangements that may be employed to implement the operation of the portion of the verification application 272 as described herein. As an alternative, the flowchart of FIG. 5A may be viewed as depicting an example of elements of a method implemented in the client device 206 (FIG. 2) according to one or more embodiments.

Beginning with box 503, the verification application 272 receives data corresponding to a machine-readable identifier 224 (FIG. 2) from a scanning application 269 (FIG. 2). In box 506, the verification application 272 determines internal characteristics 227 (FIG. 2) of the machine-readable identifier 224. In box 509, the verification application 272 determines environmental characteristics 236 (FIG. 2) of the machine-readable identifier 224.

In box 512, the verification application 272 may perform a verification of authenticity. For example, the verification application 272 may compute a checksum of the machine-readable identifier 224 and compare the checksum of a verifying identifier 242 present surrounding the machine-readable identifier 224. As another example, the verification application 272 may confirm that the machine-readable identifier 224 has a signature 233 (FIG. 2) generated by a trusted authority 215 (FIG. 2).

In box 515, the verification application 272 determines whether an on-line verification is to be performed. Such a determination may depend upon connectivity of the client device 206 to the network 209 (FIG. 2). If an on-line verification is not to be performed, the verification application 272 continues to box 516. In box 516, the verification application 272 performs one or more off-line verification actions. The verification application 272 may queue up verification requests 218 (FIG. 2) for later resolution, take initial actions that may be undone later, perform a full verification within the client device 206 in the off-line mode, and so on. The verification application 272 then proceeds to box 517.

Otherwise, if on-line verification is to be performed, the verification application 272 moves from box 515 to box 518 and generates a verification request 218 (FIG. 2). It is noted that the verification request 218 may include profiled information rather than the entirety of the captured ambient audio 245 (FIG. 2), images, etc. In box 521, the verification application 272 sends the verification request 218 to the trusted authority 215. In box 524, the verification application 272 receives a verification result 221 (FIG. 2) from the trusted authority 215.

In box 517, the verification application 272 determines whether the machine-readable identifier 224 is considered authentic. If it is considered authentic, the verification application 272 moves to box 530 and takes an action corresponding to the machine-readable identifier 224. For example, the verification application 272 may launch a URI 230 (FIG. 2) corresponding to the machine-readable identifier 224. Thereafter, the portion of the verification application 272 ends. If the machine-readable identifier 224 is not considered authentic, the verification application 272 may refrain from launching the URI and may proceed to box 533 and generate an alert. Thereafter, the portion of the verification application 272 ends.

Figure 5B:
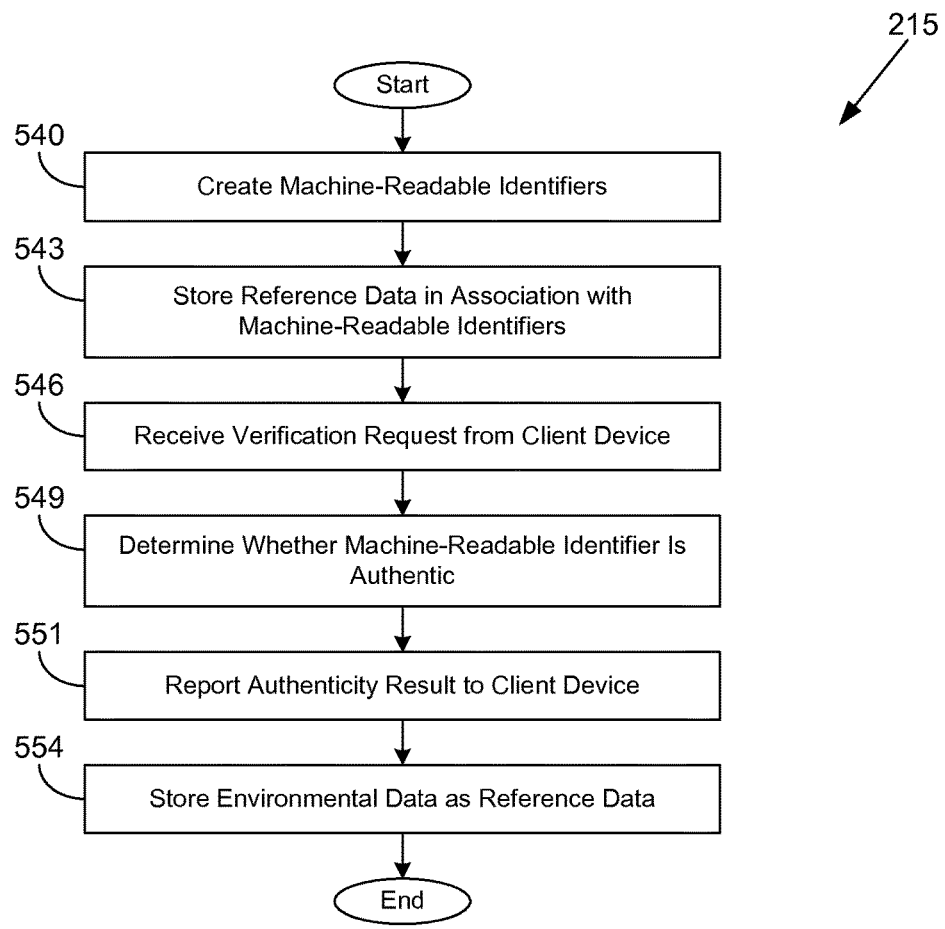
FIG. 5B is a flowchart illustrating one example of functionality implemented as portions of a trusted authority executed in a computing environment in the networked environment of FIG. 2 according to various embodiments of the present disclosure.

Moving on to FIG. 5B, shown is a flowchart that provides one example of the operation of a portion of the trusted authority 215 according to various embodiments. It is understood that the flowchart of FIG. 5B provides merely an example of the many different types of functional arrangements that may be employed to implement the operation of the portion of the trusted authority 215 as described herein. As an alternative, the flowchart of FIG. 5B may be viewed as depicting an example of elements of a method implemented in the computing environment 203 (FIG. 2) according to one or more embodiments.

Beginning with box 540, the trusted authority 215 creates one or more machine-readable identifiers 224 and/or portions of information in the machine-readable identifiers 224. For example, the trusted authority 215 may generate a signature 233 (FIG. 2) to be included in the machine-readable identifier 224. In box 543, the trusted authority 215 stores reference data in association with the machine-readable identifiers 224 as the authentic machine-readable identifier data 248 (FIG. 2).

In box 546, the trusted authority 215 receives a verification request 218 (FIG. 2) from a client device 206 (FIG. 2). In box 549, the trusted authority 215 determines whether the machine-readable identifier 224 is authentic. In this regard, a confidence score may be computed and compared against one or more thresholds. In box 551, the trusted authority 215 reports the verification result 221 (FIG. 2) to the client device 206. In box 554, the trusted authority 215 stores reference data from the verification request 218 if a crowd-sourcing technique is used. In some cases, a profile of the reference data may be stored in lieu of the entirety of the reference data. Thereafter, the operation of the portion of the trusted authority 215 ends.

Figure 6:
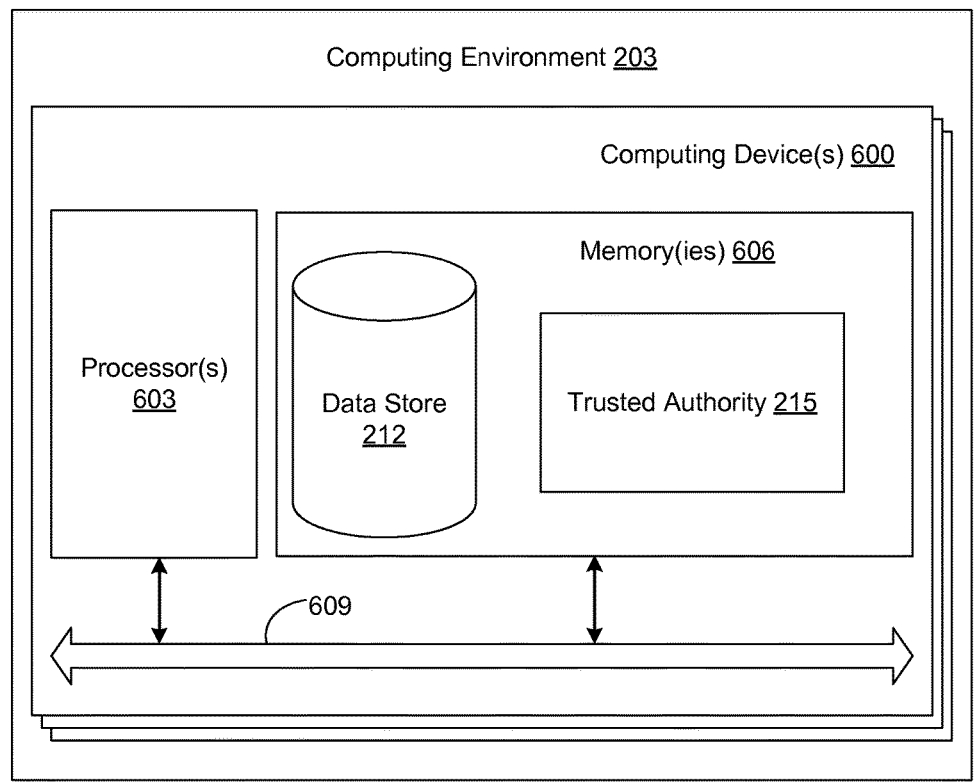
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the trusted authority 215 and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the trusted authority 215, the verification application 272 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5A and 5B show the functionality and operation of an implementation of portions of the trusted authority 215 and the verification application 272. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 5A and 5B show a specific order of execution, it is understood that the order of execution may differ from that which is depicted. For example, the order of execution of two or more blocks may be scrambled relative to the order shown. Also, two or more blocks shown in succession in FIGS. 5A and 5B may be executed concurrently or with partial concurrence. Further, in some embodiments, one or more of the blocks shown in FIGS. 5A and 5B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the trusted authority 215 and the verification application 272, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the trusted authority 215 and the verification application 272, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   in response to receiving an image, determine a first machine-readable identifier present in a first portion of the image;
   determine a second machine-readable identifier that is present in a second portion of the image and is separate from the first machine-readable identifier;
   determine whether the first machine-readable identifier is authentic based at least in part on the second machine-readable identifier;
   determine a uniform resource identifier (URI) encoded in the first machine-readable identifier;
   request a resource corresponding to the URI in response to determining that the first machine-readable identifier is authentic; and
   generate an alert in response to determining that the first machine-readable identifier is not authentic.

2. The non-transitory computer-readable medium of claim 1, wherein when executed the program further causes the at least one computing device to at least:
   send a verification request for the first machine-readable identifier to a trusted authority;
   receive a result of the verification request from the trusted authority; and
   determine whether the first machine-readable identifier is authentic based at least in part on the result of the verification request.

3. The non-transitory computer-readable medium of claim 1, wherein when executed the program further causes the at least one computing device to at least:
   determine a location of the first machine-readable identifier; and
   determine whether the first machine-readable identifier is authentic based at least in part on the location and a plurality of associations between the location and the first machine-readable identifier created by a plurality of users.

4. The non-transitory computer-readable medium of claim 1, wherein the first machine-readable identifier comprises a quick response (QR) code.

5. A system, comprising:
   at least one computing device; and
   a verification application executable in the at least one computing device, wherein when executed the verification application causes the at least one computing device to at least:
     in response to receiving, from a client device, image data comprising a first machine-readable identifier, identify, in the image data, a second machine-readable identifier that is separate from the first machine-readable identifier;
     acquire environmental data with respect to an environment of the first machine-readable identifier; and
     verify an authenticity of the first machine-readable identifier based at least in part on the environmental data and the second machine-readable identifier.

6. The system of claim 5, wherein the first machine-readable identifier comprises a visual identifier.

7. The system of claim 5, wherein the environmental data corresponds to ambient audio captured from the environment, and wherein when executed the verification application further causes the at least one computing device to at least compare the ambient audio with reference ambient audio associated with the first machine-readable identifier to verify the authenticity of the first machine-readable identifier.

8. The system of claim 5, wherein the environmental data corresponds to a determined location, and wherein when executed the verification application further causes the at least one computing device to at least compare the determined location with a reference location associated with the first machine-readable identifier to verify the authenticity of the first machine-readable identifier.

9. The system of claim 5, wherein the environmental data corresponds to an image of an area adjacent to the first machine-readable identifier, and wherein when executed the verification application further causes the at least one computing device to at least compare the image with reference image data associated with the first machine-readable identifier to verify the authenticity of the first machine-readable identifier.

10. The system of claim 5, wherein the environmental data corresponds to an image of an area adjacent to the first machine-readable identifier, wherein when executed the verification application further causes the at least one computing device to at least recognize text contained within the image, and verify the authenticity of the first machine-readable identifier based at least in part on the text.

11. The system of claim 10, wherein when executed the verification application further causes the at least one computing device to at least compare the text with reference text associated with the first machine-readable identifier to verify the authenticity of the first machine-readable identifier.

12. The system of claim 10, wherein when executed the verification application further causes the at least one computing device to at least compare a characteristic of the text with an internal characteristic of the first machine-readable identifier to verify the authenticity of the first machine-readable identifier.

13. A method, comprising:
- sending, via at least one of the one or more computing devices, a verification request for a machine-readable identifier to a trusted authority, the verification request including image data comprising the machine-readable identifier and a verifying identifier, wherein the machine-readable identifier is a first type of optical code and the verifying identifier is a second type of optical code;
- receiving, via at least one of the one or more computing devices, a result of the verification request from the trusted authority; and
- performing, via at least one of the one or more computing devices, an action with respect to the machine-readable identifier based at least in part on the result of the verification request.

14. The method of claim 13, further comprising:
- determining, via at least one of the one or more computing devices, a cryptographic signature included in the machine-readable identifier; and
- generating, via at least one of the one or more computing devices, the verification request based at least in part on the cryptographic signature.

15. The method of claim 13, further comprising:
- determining, via at least one of the one or more computing devices, a current location; and
- generating, via at least one of the one or more computing devices, the verification request based at least in part on the current location.

16. The method of claim 13, further comprising:
- capturing, via at least one of the one or more computing devices, ambient audio; and
- encoding, via at least one of the one or more computing devices, at least one characteristic of the ambient audio in the verification request.

17. The method of claim 13, wherein performing the action further comprises launching, via at least one of one or more computing devices, a uniform resource locator (URL) embodied in the machine-readable identifier in response to the machine-readable identifier being authentic.

18. The method of claim 13, wherein performing the action further comprises refraining from launching, via at least one of the one or more computing devices, a uniform resource locator (URL) embodied in the machine-readable identifier in response to the machine-readable identifier being not authentic.

19. The method of claim 13, wherein performing the action further comprises generating, via at least one of the one or more computing devices, an alert in response to the machine-readable identifier being not authentic.

20. A system, comprising:
- at least one computing device; and
- a trusted authority executed in the at least one computing device that causes the at least one computing device to at least:
  - in response to receiving from a client a verification request for a machine-readable identifier, verify an authenticity of the machine-readable identifier based at least in part on a verifying identifier, wherein the machine-readable identifier is a first type of optical code and the verifying identifier is a second type of optical code; and
  - report the authenticity of the machine-readable identifier to the client.

21. The system of claim 20, wherein when executed the trusted authority further causes the at least one computing device to at least verify a cryptographic signature included in the machine-readable identifier to verify the authenticity of the machine-readable identifier.

22. The system of claim 20, wherein when executed the trusted authority further causes the at least one computing device to at least capture environmental data that comprises at least one of: image data, ambient audio data, location data, or magnetic direction data to verify the authenticity of the machine-readable identifier.

23. The system of claim 22, wherein when executed the trusted authority further causes the at least one computing device to at least:
- determine a confidence score based at least in part on a measure of quality of the environmental data; and
- determine the authenticity of the machine-readable identifier by comparing the confidence score with an authenticity threshold.

* * * * *